(12) United States Patent
Killmann et al.

(10) Patent No.: US 10,946,416 B2
(45) Date of Patent: Mar. 16, 2021

(54) SEPARATION DEVICE WITH A CONVEYOR FEEDING SYSTEM

(71) Applicant: STEINERT GMBH, Cologne (DE)

(72) Inventors: Dirk Killmann, Bruehl (DE); Jann Eilers, Cologne (DE); Andreas Laumen, Cologne (DE)

(73) Assignee: Steinert GmbH, Cologne (DE)

( * ) Notice: Subject to any disclaimer, the term of this patent is extended or adjusted under 35 U.S.C. 154(b) by 120 days.

(21) Appl. No.: 16/090,339

(22) PCT Filed: Mar. 30, 2017

(86) PCT No.: PCT/EP2017/000387
§ 371 (c)(1),
(2) Date: Oct. 1, 2018

(87) PCT Pub. No.: WO2017/167446
PCT Pub. Date: Oct. 5, 2017

(65) Prior Publication Data
US 2019/0111455 A1    Apr. 18, 2019

(30) Foreign Application Priority Data
Apr. 1, 2016   (DE) .......................... 102016003766.0

(51) Int. Cl.
*B65G 47/44*   (2006.01)
*B07C 5/342*   (2006.01)
(Continued)

(52) U.S. Cl.
CPC ............ *B07C 5/342* (2013.01); *B65G 11/083* (2013.01); *B65G 37/00* (2013.01); *B65G 47/44* (2013.01);
(Continued)

(58) Field of Classification Search
CPC .. B65G 11/083; B65G 2201/04; B65G 37/00; B65G 5/342; B65G 47/44; B65G 43/08;
(Continued)

(56) References Cited

U.S. PATENT DOCUMENTS 2,818,160 A    12/1957 Lamouria
2,929,500 A *   3/1960 Warner ................. B07C 5/3425
                                                209/581

(Continued)

FOREIGN PATENT DOCUMENTS

CN          204847278 U    12/2015
DE          1456980 A1      5/1969
(Continued)

*Primary Examiner* — Patrick H Mackey
(74) *Attorney, Agent, or Firm* — Laurence A. Greenberg; Werner H. Stemer; Ralph E. Locher (57) ABSTRACT

A separation device has a conveying channel configuration and a transport belt configuration. A conveying material can be conveyed via the conveying channel configuration on the transport belt configuration, the conveying channel configuration has differently inclined regions, and a speed cascade of the conveyed material stream can be achieved by the differently inclined regions. The separation of the conveyed material stream is improved in that the conveying channel configuration has at least one wedge groove.

14 Claims, 4 Drawing Sheets

(51) Int. Cl.
*B65G 11/08* (2006.01)
*B65G 37/00* (2006.01)
*B65G 43/08* (2006.01)
*B65G 27/24* (2006.01)

(52) U.S. Cl.
CPC .............. *B07C 2501/0036* (2013.01); *B07C 2501/0054* (2013.01); *B65G 27/24* (2013.01); *B65G 43/08* (2013.01); *B65G 2201/04* (2013.01)

(58) Field of Classification Search
CPC .......... B65G 27/24; B07C 2501/0036; B07C 2501/0054
USPC ........ 198/565, 602, 609, 610; 209/911, 920, 209/921, 922, 923
See application file for complete search history.

(56) References Cited

U.S. PATENT DOCUMENTS

| | | | |
|---|---|---|---|
| 3,338,385 A | | 8/1967 | Sage |
| 3,545,610 A | * | 12/1970 | Kelly .................... B07C 5/3425 209/579 |
| 3,621,981 A | | 11/1971 | Nimmo, Jr. et al. |
| 3,628,648 A | | 12/1971 | McClusky |
| 3,730,386 A | | 5/1973 | Monsees |
| 4,074,807 A | * | 2/1978 | Goulds .................... B07C 5/02 198/445 |
| 4,194,634 A | * | 3/1980 | Kelly .................... B07C 5/346 209/589 |
| 4,421,222 A | | 12/1983 | Stuermer |
| 4,848,590 A | * | 7/1989 | Kelly .................... B07C 5/3427 209/564 |
| 5,236,092 A | * | 8/1993 | Krotkov .................... B07C 5/02 198/609 |
| 5,314,056 A | | 5/1994 | Davis et al. |
| 5,522,512 A | * | 6/1996 | Archer .................... B65B 57/14 209/580 |
| 5,713,473 A | * | 2/1998 | Satake .................... B07C 5/3416 209/580 |
| 6,059,117 A | * | 5/2000 | Novak .................... B07C 5/3416 209/10 |
| 9,339,849 B2 | | 5/2016 | Pillkahn |
| 2015/0053535 A1 | | 2/2015 | Silva |

FOREIGN PATENT DOCUMENTS

| | | |
|---|---|---|
| DE | 2102706 A1 | 8/1972 |
| DE | 4143235 A1 | 6/1993 |
| DE | 102004047848 A1 | 4/2005 |
| DE | 202006014795 U1 | 11/2006 |
| DE | 102012015812 A1 | 2/2013 |
| EP | 2777828 A1 | 9/2014 |
| JP | S6036207 A | 2/1985 |
| JP | H0237117 U | 3/1990 |
| JP | H0237118 U | 3/1990 |
| WO | 2014029493 A1 | 2/2014 |

* cited by examiner

SEPARATION DEVICE WITH A CONVEYOR FEEDING SYSTEM

BACKGROUND OF THE INVENTION

Field of the Invention

The invention relates to a separation device in accordance with the features of the preamble of the main separation device patent claim.

Furthermore, the invention relates to a sorting apparatus having a separation device of this type.

Separation devices of this type are used, in particular, as part of a sorting apparatus having at least one sensor.

Separation apparatuses are known in the prior art, which separation apparatuses are not yet of optimum configuration, however. The aim of the separation apparatus is to separate material to be conveyed which is present as a heap, in such a way that the material to be conveyed is finally arranged in a pearl chain-shaped manner, namely serialized particle by particle on a transport belt arrangement. Said pearl chain-like arrangement is advantageous, in particular, in the case of sorting of the material to be conveyed, since the linear and spaced apart arrangement of the material to be conveyed can be detected only in this way by way of a sensor with a spatially limited measuring region. The material to be conveyed is conveyed to the downstream transport belt arrangement by means of a conveyor chute arrangement. The conveyor chute arrangement then has regions which are inclined to a different extent, it being possible for a speed cascade of the stream of material to be conveyed to be achieved by way of the regions which are inclined to a different extent. Here, the regions can be formed by way of conveyor chutes which are inclined to a different extent or by way of a conveyor chute with sliding faces which are inclined to a different extent or by way of conveyor chutes with different oscillating parameters, such as amplitude, direction and frequency.

DE 10 2012 015 812 A1 which forms the generic prior art has disclosed a method for recycling scrap steel items, in which the scrap steel items are treated with at least one liquid in order to remove surface coatings. A spectroscopic analysis of the scrap steel composition takes place after this. The scrap steel items are examined by means of an LIBS sensor (LIBS stands for "Laser-Induced Breakdown Spectroscopy"). There is then a separation device for feeding the scrap steel items to the LIBS sensor. The separation device has transport belts and conveyor chutes in the form of oscillating conveyors, in particular oscillating chutes or shaking conveyors. The separation of the scrap steel items takes place in such a way that a plurality of said modules are arranged behind one another, and the scrap steel items are then moved at different speeds. A first module moves the scrap steel items at a relatively low speed of, for example, 5 meters per minute. The scrap steel items are transferred from said module to a further module which moves the scrap steel items at a considerably higher speed of, for example, 180 meters per minute. In this way, the spacing between the scrap steel items is increased, that is to say a separation takes place which makes a separate analysis of the scrap steel items possible. The scrap steel items are moved by way of said conveyor belt arrangement or transport belt arrangement in a speed cascade of initially 5 meters per minute, then 25 meters per minute, 100 meters per minute and finally 180 meters per minute. Oscillating conveyors are arranged in the region at a low speed, and transport belts are arranged in regions at a higher speed. The scrap items are first of all distributed uniformly onto an oscillating chute surface. Subsequently, the scrap items are guided into predefined tracks by way of defined flow obstacles.

Said separation device and the sorting apparatus which is formed in this way are not yet of optimum configuration, however, since the flow obstacles brake the steel scrap items, that is to say the material to be conveyed, and the throughput speed is thus lowered. Furthermore, there is the risk that the flow obstacles deflect the scrap steel items laterally and the scrap steel items are no longer detected by the sensor during the sorting operation as a result of the offset which is produced, since the scrap steel items have to pass through the spatially limited sensor measuring region.

DE 20 2006 014 795 U1 has disclosed a separation device in the form of a vibration sorting unit for rod-shaped material to be sorted, such as screws or the like. The vibration sorting unit has a drivable sorting material bowl and a linear conveyor which is arranged on the outlet side of the bowl and is inclined in the transport direction. The linear conveyor has lateral guides for the material to be sorted. The gradient increases along the conveying path. A first conveyor chute of the linear conveyor is inclined at an angle of 15° with respect to the horizontal. The first conveyor chute is adjoined in its axial extension by a second conveyor part in the form of a slide. Said second conveyor part is inclined at an angle of 30° with respect to the horizontal. The first conveyor part is set in vibration, and the second conveyor part is not set in vibration.

DE 2 102 706 A has disclosed a separation device, a funnel-shaped inlet being used, from which the parts to be sorted, in particular corresponding grains, flow into a chute. The particle stream in the chute is slowed down or stopped directly in the inlet periodically at short time intervals, by a member which is moved up and down being provided in the chute. Furthermore, said document has disclosed using an oscillating conveyor with a V-shaped, downwardly inclined chute. Said embodiment is rejected as being too slow, however, since even a comparatively small number of particles lie individually behind one another only after a long conveying path.

DE 10 2004 047 848 A1 has disclosed a method and an apparatus for sorting separated test pieces, the test pieces being transported by means of a conveying section from a feed apparatus to an image processing means. Here, an increase in the speed of the test pieces takes place along the conveying section by virtue of the fact that a curvature of a sliding face downward is of increasing configuration, with the result that as uniform an acceleration as possible acts on the test piece as a result. As a result, the test pieces move in a speed cascade, the different regions being formed by way of the one sliding surface.

SUMMARY OF THE INVENTION

The invention is based on the object of then configuring and developing the separation device which forms the generic type, in such a way that the separation of the stream of material to be conveyed is improved.

Said object, on which the invention is based, is then achieved by way of a separation device having the features of the main separation device patent claim.

The arrangement for material to be conveyed has at least one wedge-shaped chute. The material to be conveyed or the parts of material to be conveyed is/are conveyed in a speed cascade by way of the one or plurality of wedge-shaped chutes. This has the advantage that the material to be conveyed is centered in the middle, in particular with regard to the measuring region of the sensor, at a high throughput in the case of the separation and is thus then lined up in a pearl chain-like manner. Furthermore, the throughput is increased by way of the use of at least one, in particular driven wedge-shaped chute. Aggregate materials are smoothed by way of shaking movements of the conveyor chute arrangement. This aids the configuration of a uniform particle stream or uniform stream of material to be conveyed. The aggregate materials are produced, for example, as a delay of a non-uniform, batchwise feeding of the entire system, in particular of the sorting apparatus. The use of the at least one wedge-shaped chute and, in particular, of at least two wedge-shaped chutes has the advantage that a separation can be achieved with a high throughput, the risk of a lateral offset of the material to be conveyed when running through the conveying section being reduced. As a result, the separation method or the separation of the material to be conveyed or the respective items/parts of the material to be conveyed is improved.

By way of the separation device, a "monolayer" can be achieved, the parts of the material to be conveyed being arranged, in particular, spaced apart from one another on the transport belt arrangement. It is conceivable that the materials to be conveyed or parts of the material to be conveyed are arranged in a monolayer, but individual materials to be conveyed or parts of the material to be conveyed which lie next to one another are in contact.

The material to be conveyed which is to be sorted or the parts of the material to be conveyed can be guided by the conveyor chute arrangement onto the transport arrangement. The material to be conveyed is then transferred from the last wedge-shaped chute onto the transport belt arrangement; a lateral offset during the transition to the transport belt arrangement is to be avoided. This is achieved, in particular, by way of a specific shape of the transport belt, in particular by way of a trough-shaped form and/or V-shape of the transport belt in at least one region. The trough-shaped form and/or V-shape of the transport belt can preferably be configured and/or adjusted, in particular can also be set, by way of guide elements or segments which are arranged under the transport belt. The V-shape of the transport belt is, in particular, a specific shape of a troughed transport belt, a V-shape of the transport belt then preferably being narrower than the V-shape of the last wedge-shaped chute. As a result, the parts of the material to be conveyed are forced even further into the center.

The conveyor chute arrangement has regions which are inclined to a different extent, the regions which are inclined to a different extent making a speed cascade with rising conveying speeds of the stream of material to be conveyed possible. The regions are formed, in particular, by way of wedge-shaped chutes which are inclined to a different extent. There are preferably at least two regions with in each case one wedge-shaped chute or a plurality of wedge-shaped chutes, the wedge-shaped chutes in the two regions having different inclinations. The conveyor chute arrangement can have, in particular, at least one first wedge-shaped chute and at least one second wedge-shaped chute, the second wedge-shaped chute being arranged downstream of the first wedge-shaped chute, the material to be conveyed being capable of being transferred or being transferred from the last, second wedge-shaped chute onto the transport belt arrangement. Here, the downstream, second wedge-shaped chute or else downstream second wedge-shaped chutes has/have a more pronounced inclination than the first wedge-shaped chute which is arranged upstream. Here, the second wedge-shaped chute is arranged such that it is inclined to a more pronounced extent or can be arranged such that it is inclined to a more pronounced extent than the first wedge-shaped chute. The gradient increases along the conveyor chute arrangement. The wedge-shaped chutes are arranged, in particular, in one line. As an alternative, wedge-shaped chutes can be arranged at an angle with respect to one another, in particular also at a right angle, at a wide angle or at an acute angle.

It is conceivable that a plurality of first wedge-shaped chutes are arranged parallel to one another. Here, a plurality of second wedge-shaped chutes are then likewise arranged parallel to one another, in order to increase the throughput even further by way of the parallel arrangement of the wedge-shaped chutes. Furthermore, it is conceivable to use wedge-shaped chutes with a plurality of V-shaped regions which are configured next to one another, said wedge-shaped chutes preferably being used in combination with a plurality of parallel troughed and/or V-shaped belts (transport belts) or a split belt. Here, the wedge-shaped chute can then have a correspondingly wide multiple-wedge conveying bottom and can operate, in particular, with a common drive for the conveying bottom with the V-shaped regions.

There are preferably one first wedge-shaped chute and precisely one second wedge-shaped chute.

The material to be conveyed is transferred by the second wedge-shaped chute onto the transport belt arrangement, a drop height for the material to be conveyed onto the transport belt arrangement at the end of the second wedge-shaped chute being small enough to avoid significant, lateral jumping and, in particular, above all, overturning of the material to be conveyed. The drop height of the material to be conveyed between the first and the second wedge-shaped chute is, in particular, greater than the drop height of the material to be conveyed between the second wedge-shaped chute and the transport belt arrangement. The separation of the material to be conveyed or the parts of material to be conveyed is assisted by virtue of the fact that the drop height between the first and the second wedge-shaped chute is higher. If, in particular, two parts of material to be conveyed still lie above one another in the first wedge-shaped chute, they are separated by way of the greater fall distance between the first and the second wedge-shaped chute. In addition, entangled parts of material to be conveyed can be detached from one another by way of the impact on the second wedge-shaped chute. Here, the materials to be conveyed or parts of material to be conveyed have a defined grain size. The drop height between the first and the second wedge-shaped chute is, in particular, greater than the respective grain size of the material to be conveyed.

The speed of the transport belt arrangement is greater than or at least as great as the end speed of the material to be conveyed at the end of the second wedge-shaped chute.

The conveyor arrangement preferably has a driven bunker chute. The material to be conveyed is transferred by the bunker chute onto the first wedge-shaped chute. The bunker chute is configured, in particular, as a vibration conveyor. The bunker chute is preferably configured as a magnetically oscillating chute. The configuration as a magnetically oscillating chute has the advantage that the amplitude of the movement is small and the frequency can be regulated with a short reaction time. As a result, particularly satisfactory metering of the conveying stream is made possible.

As an alternative, the bunker chute could be formed by way of an unbalanced chute which can be regulated satisfactorily. As an alternative to the use of a bunker chute, a slowly running conveyor belt which can be regulated satisfactorily can be used. The purpose of said bunker chute or the slow conveyor belt is the "buffer storing" of material.

The buffer-stored material is output in a metered manner, in particular to the first wedge-shaped chute.

In one particularly preferred refinement, the filling level of the, in particular, driven bunker chute or the filling level of the upstream conveyor belt can be detected by means of a filling level sensor, in particular by means of a filling level camera. A 3D TOF (TOF=Time Off Light) camera or a normal video camera and a height measurement by ultrasound can be used as a filling level sensor. The material stream movement or the stream of material to be conveyed can be measured in sections in the bunker chute or in the upstream conveyor belt by means of the filling level sensor. As a result, a volumetric flow which is as uniform as possible can be set in a regulated manner at the projection point of the bunker chute or the upstream conveyor belt. There is preferably a control or regulating circuit. By means of the regulating circuit, the speed of the bunker chute or said first conveyor belt can be regulated in a manner which is dependent on the filling level. As a result, a homogenization of the material stream is made possible. The bunker chute or the first, upstream conveyor belt can be regulated and/or controlled in a manner which is dependent on the sensor data of the filling level sensor. This simplifies the separation operation. In addition, in the case of overfilling of the bunker chute or the upstream conveyor belt, a signal can be output, in order to briefly interrupt the delivery to the bunker chute or to the conveyor belt.

The two wedge-shaped chutes preferably have in each case one drive which sets the wedge-shaped chutes in oscillation by means of an unbalance. The aggregate material can be loosened and driven forward by way of regulation or control of the amplitude and/or the frequency. The inclinations of the wedge-shaped chutes are to be adapted in such a way that the retention time in the first wedge-shaped chute is sufficient to achieve a homogeneous distribution of the material to be conveyed. The wedge shape is configured in such a way that the materials to be conveyed or the parts of material to be conveyed are arranged in the center of the chute during transport. Here, the wedge shape and/or the oscillation direction are/is adapted, in particular, to the grain size of the respective materials to be conveyed or the parts of material to be conveyed. The shape of the two wedge-shaped chutes is configured, in particular, in such a way that the material to be conveyed or the parts of material to be conveyed is/are transported in the center of the wedge-shaped chutes with regard to the conveying direction.

The inclination of the first wedge-shaped chute is selected in such a way that the material to be conveyed or the parts of material to be conveyed are conveyed more rapidly than in the bunker chute or in the upstream conveyor belt. The conveying speed in the second wedge-shaped chute is greater than in the first wedge-shaped chute.

The inclination of the wedge-shaped chutes can preferably be set. The drive of the wedge-shaped chutes can preferably be regulated and/or controlled. The bunker chute is arranged at a higher location than the first wedge-shaped chute. The first wedge-shaped chute is arranged at a higher location than the second wedge-shaped chute. The second wedge-shaped chute is arranged at a higher location than the transport belt arrangement.

The conveying speed of the transport belt can be greater than the end speed of the material to be conveyed or the parts of material to be conveyed at the end of the second wedge-shaped chute.

The transport belt is of flat configuration in a first region. A second region which is, in particular, of troughed and/or V-shaped configuration is arranged downstream of the first region. The material to be conveyed passes from the second wedge-shaped chute onto the transport belt, into the troughed and/or V-shaped region of the transport belt. The last wedge-shaped chute ends in the region of the trough and/or in the region of the V-shape of the transport belt. An adaptation of the speed of the material to be conveyed or the parts of material to be conveyed to the speed of the transport belt then first of all takes place. In said second region of the transport belt, the transport belt arrangement is, in particular, of trough-like and/or V-shaped configuration, in order to ensure centering of the material to be conveyed or the parts of material to be conveyed in the region of the sensor. A "trough" and/or V-shape help/helps in the central orientation of the material to be conveyed or the parts of material to be conveyed. The parts of material to be conveyed can thus not jump away toward the side, but rather rebound on the protruding belt flanks back into the center of the trough or into the lower region of the V-shaped transport belt. After a defined distance, for example approximately 1 meter, the trough and/or V-shape can be merged gently again into a flat belt section. The transport belt is deflected on the end sides, the transport belt being of substantially flat arrangement or configuration here. The parts of material to be conveyed also remain in the center in said third region, since the parts of material to be conveyed are not subjected to any jolt. The trough and/or V-shape can be brought about, in particular, by way of guide elements (or segments) which are arranged below the transport belt, the guide elements having or forming a trough shape or wedge shape, and the transport belt running along said guide elements and being shaped as a result. By means of the guide elements, the transport belt which is, in particular, of flexible configuration can be of troughed and/or V-shaped configuration and/or arrangement, in particular segment by segment. The guide elements are preferably arranged in different segments, it being possible for the guide elements to be adjusted, in particular, also segment by segment, in particular with regard to the trough shape or the wedge shape (V-shape).

Subsequently, that is to say after the adaptation of the transport speed, the measurement takes place by means of the at least one sensor. The measurement can also take place in the second, troughed and/or V-shaped region and/or in the flat, third region of the transport belt. For example, measurement can also be carried out by way of a 3D camera in the trough and/or in the V-shape and/or by way of an LIBS sensor in the flat, third region.

In one alternative refinement to a transport belt which is shaped in a trough-like and/or V-shaped manner, two transport belts can be used which lie substantially in a V-shaped manner with respect to one another and then form a V-shaped arrangement. Centering of the material to be conveyed or the parts of material to be conveyed in the region of the sensor is likewise made possible by way of said V-shaped arrangement of the transport belts. Here, both the transfer from the wedge-shaped chute and the measurement take place, in particular, in the V-shaped arrangement of the transport belt arrangement.

In one refinement, the material to be conveyed or respective parts of material to be conveyed is/are then discharged downstream of the sensor, in particular by way of air blasts, water blasts or the like. After the sensor detection and evaluation of the sensor data by means of a decision logic means of a data processing system, the parts of material to be conveyed are either removed or pass the end of the transport belt arrangement. In one particularly preferred refinement, the transport belt is of dimpled or corrugated configuration, with the result that the material to be conveyed or the parts of material to be conveyed cannot lie completely flat on the surface of the transport belt, but rather the dimples or corrugations make an intermediate space possible between the material to be conveyed or the parts of material to be conveyed and the transport belt bottom, and the material to be conveyed or the parts of material to be conveyed can thus be swept away particularly satisfactorily by an air blast or water blast. In the configuration of the transport belts which are arranged in a V-shaped manner with respect to one another, an air blast might also, in particular, be shot from below through a provided gap in an upward direction. Depending on the embodiment, the removal can therefore take place by way of compressed air blasts, mechanical rams or flaps from below, above and/or from the side in relation to the conveying direction. This refinement which was mentioned last, in particular, is preferred, in particular, in the case of the separation of sheet metal parts or of other, in particular planar parts of material to be conveyed.

A lateral discharge preferably takes place. The lateral discharge has the advantage that a plurality of fractions can thus be discharged one after another. The position of the parts of material to be conveyed can be calculated over a relatively long transport region. In order to ensure a lateral discharge, a plurality of lateral discharge units are then preferably provided in the discharge zone. Said discharge units can operate by way of compressed air, or can use a ram or else flaps or the like. If X discharge units are provided, a total of X+1 fractions can be sorted in one sorting pass.

Furthermore, it is conceivable that a blow strip is arranged in said discharge region or in the discharge zone, it being possible for a separation of the material to be conveyed or respective parts of material to be conveyed into different grades to take place by means of the blow strip, by the material to be conveyed or the parts of material to be conveyed either following a normal trajectory or being deflected by way of a compressed air or water blast by means of the blow strip, and a separation thus then taking place.

In the case of a sorting apparatus having a separation device, there is then at least one sensor, in particular there are a plurality of sensors, in order to detect material properties or other features of the material to be conveyed or the respective parts of material to be conveyed. The material to be conveyed or the parts of material to be conveyed can be graded using the detected material properties or other features. In addition to the material properties, the sensors can detect, for example, the size or shape of the material to be conveyed or the respective parts of material to be conveyed, and can compare this with corresponding sorting criteria.

There is preferably a 3D sensor, in particular a camera for measuring in accordance with the principle of laser triangulation with a line laser as light source. The entire width of the conveyor belt is preferably detected by means of the 3D sensor, as a result of which a check can be carried out as to whether all parts of material to be conveyed pass the measuring region or whether individual parts of material to be conveyed do not lie centrally in the measuring region and are thus not detected in an optimum manner. The parts of material to be conveyed which do not lie centrally can be screened out into a special product fraction.

A separation and central arrangement of the parts of material to be conveyed in the region of the sensors take place by way of the proposed measures. The sensors can measure in a locally limited region, as a result of which the measurement can be simplified and improved. It is not necessary, for example, to arrange a plurality of sensors next to one another, but rather it can be sufficient to measure the material properties merely by means of one sensor.

There can be, in particular, an LIBS sensor as sensors for measuring the material properties. Said LIBS sensor either measures merely at one defined point, or a deflecting system is provided, it being necessary, however, for a laser beam to be deflected only to a small extent by means of the deflecting system, in order to detect different regions of the parts of material to be conveyed. As an alternative, there can be an XRF detector, a Raman spectrometer or a high resolution optical camera.

Furthermore, it is conceivable to carry out point measurements by way of optical spectrometers, for example by way of NIR spectrometers. Furthermore, it is possible to use an inductive sensor and/or radioscopic X-ray sensors. The X-ray sensors can preferably analyze the material to be conveyed from more than one radioscopic direction, since the parts of material to be conveyed lie behind one another.

It is conceivable that there is a first sensor in the form of a 3D camera in accordance with the principle of laser triangulation, or a laser height measurement or a color camera or a greyscale camera for positional determination. The second sensor for measuring the material properties can be selected from the abovementioned group. A combination of sensors of the stated groups is also possible.

Since the parts of material to be conveyed are arranged in a separated manner on the transport belt, it is conceivable, furthermore, that the parts of material to be conveyed are sensed by way of sensors not only from above, but rather also from the side in a fall distance which is arranged downstream of the transport belt arrangement. For example, cameras can be provided which scan the parts of material to be conveyed from all sides and therefore detect the entire surface.

In order to improve the separation, further aids can be provided, in particular, in the region of the second wedge-shaped chute. For example, height limiting means can be provided in the region of the second wedge-shaped chute, which height limiting means ensure that merely a "monolayer" passes onto the transport belt. A brush head can be arranged, for example, above the second wedge-shaped chute. The brush head can have, for example, individual flexible brushes, the brush head rotating and separating the parts of material to be conveyed from one another if they lie on one another in multiple layers. The rotational movement of the brush head prevents that the parts of material to be conveyed come into contact with a substantially slower barrier, and the risk is thus reduced that a blockage is brought about. As an alternative, the height limiting means can be configured as suspended tabs or the like.

The disadvantages which were mentioned at the outset are therefore avoided, and corresponding advantages are achieved.

There are then a multiplicity of options to advantageously configure and/or develop the separation device according to the invention or a sorting apparatus with a separation device of this type. In this regard, reference is made first of all to the patent claims which refer back to main patent claims. One preferred refinement of the invention will be described in greater detail in the following text using the drawing and the following description. In the drawing:

Figure 1:
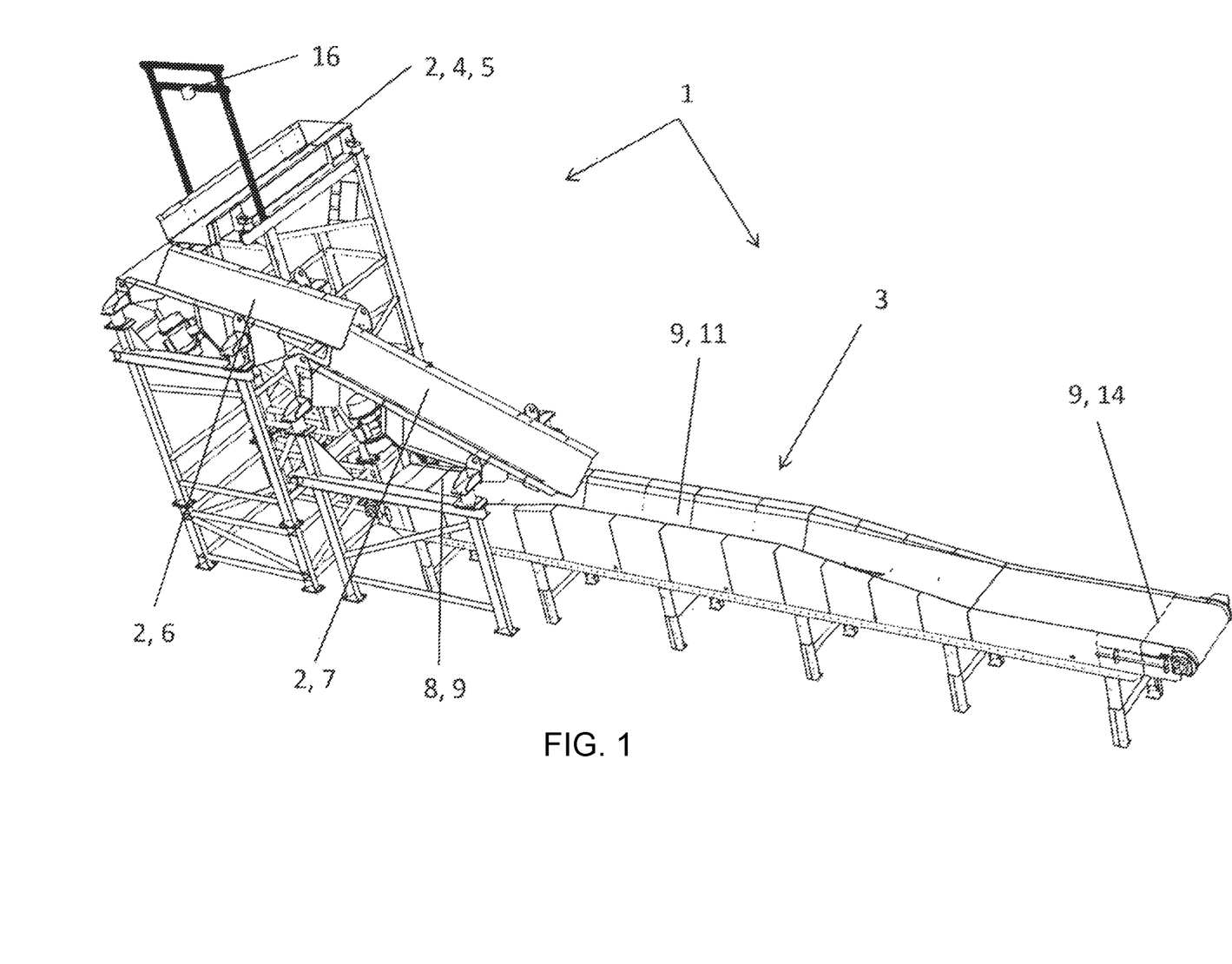
FIG. 1 shows a separation device according to the invention in one preferred embodiment, in a diagrammatic perspective illustration.
Figure 2:
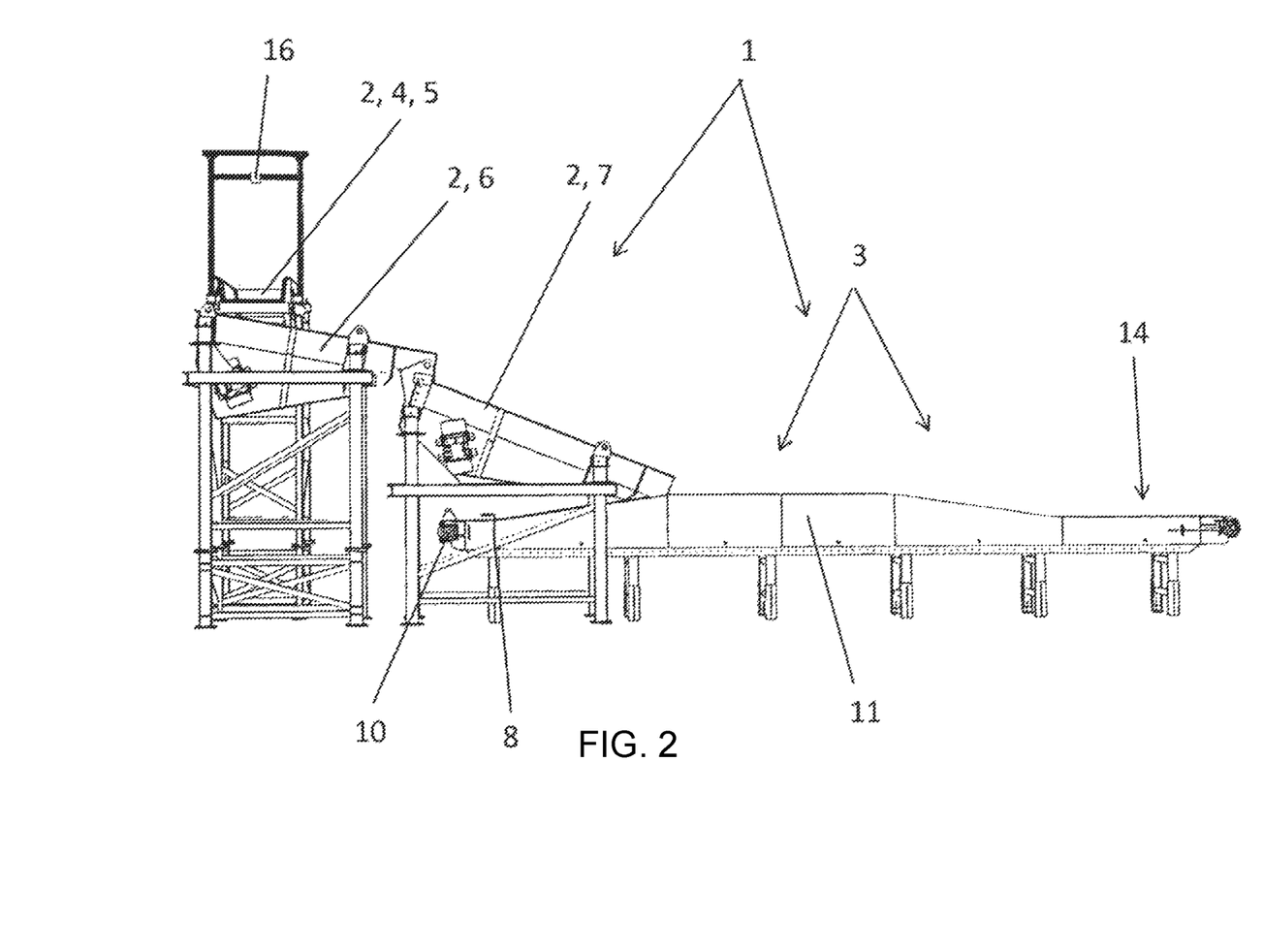
FIG. 2 shows a diagrammatic perspective side view of the separation device from FIG. 1 with essential components.
Figure 3:
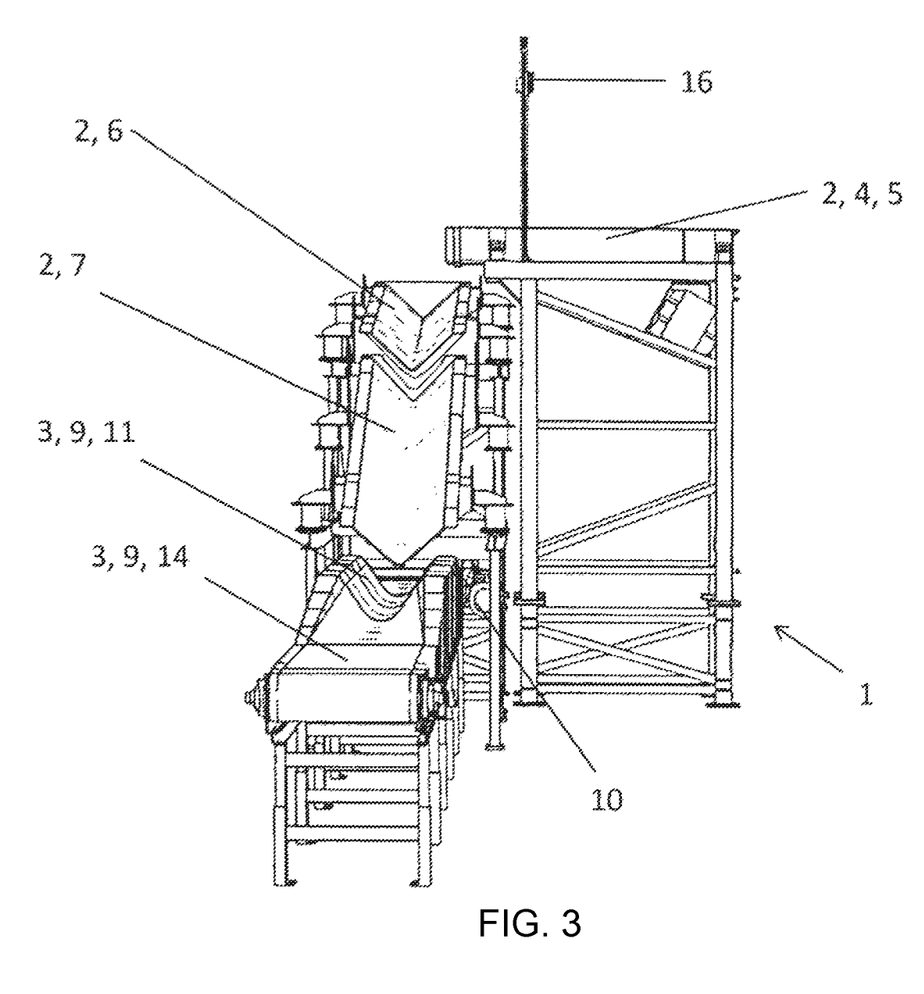
FIG. 3 shows a diagrammatic perspective illustration of a diagrammatic front-side view of the separation device from FIG. 2.

FIGS. 1 to 3 will first of all be described in greater detail:

DESCRIPTION OF THE INVENTION

A separation device 1 can be seen clearly in FIGS. 1 to 3. The separation device 1 serves to separate material to be conveyed which is present, in particular, as an aggregate material. For example, metal parts, metal scrap, lumps of ore, batteries, packagings, waste or the like or an even partially corresponding mixture of the above-mentioned components can serve as material to be conveyed or parts of material to be conveyed. If "material to be conveyed" is therefore mentioned in general at the outset and/or in the following text, "parts of material to be conveyed" are meant, or if a "stream of material to be conveyed" is mentioned at the outset and/or in the following text, the stream of the "parts of material to be conveyed" is meant.

The separation device 1 has a conveyor chute arrangement 2. The material to be conveyed passes from the conveyor chute arrangement 2 onto a transport belt arrangement 3. The material to be conveyed can be guided onto the transport belt arrangement 3 by means of the conveyor chute arrangement 2.

The conveyor chute arrangement 2 then has conveyor chute regions which are inclined to a different extent, it being possible for a speed cascade of the stream of material to be conveyed to be achieved by way of the regions which are inclined to a different extent.

The conveyor chute arrangement 2 then first of all has a bunker chute 4. The bunker chute 4 has a flat floor. The material to be conveyed which is present first of all as an aggregate material is conveyed into the bunker chute 4 by means of corresponding transport belts or the like. The bunker chute 4 is preferably configured as a vibration conveyor, namely, in particular, as a magnetically oscillating chute 5. The bunker chute 4 is oriented substantially horizontally or has a slight inclination. Movements of the material to be conveyed within the bunker chute 4 take place by way of the drive of the bunker chute 4. The use of a magnetically oscillating chute 5 has the advantage that the conveying speed within the bunker chute 4 can be regulated rapidly. The bunker chute 4 serves to output the material stream or stream of material to be conveyed in as metered a manner as possible to the downstream regions of the conveyor chute arrangement 2, with the result that a homogeneous stream of material to be conveyed is produced.

In one particularly preferred refinement, the bunker chute 4 is assigned a filling level sensor 16, in particular a spatial resolution filling level camera, by means of which the filling level of the bunker chute 4 can be detected. In particular, the material which lies in the vicinity of the ejection edge (not denoted in greater detail) is detected by means of the filling level sensor 16. For example, the stream of material to be conveyed in the bunker chute is detected at 4 images per second. A regulating circuit can then be constructed by means of the filling level sensor 16, with the result that the material stream of the material to be conveyed or the stream of material to be conveyed can be output by the bunker chute 4 as homogeneously as possible to the following chutes. The regulation can take place, for example, at one second intervals. The filling level camera measures the filling level. Here, the movement of the material in the bunker chute 4 can be tracked via a pattern recognition. Here, the bunker chute 4 is arranged transversely with respect to the remaining, in particular linear arrangement of the conveyor chute arrangement 2. This facilitates the separation of the stream of material to be conveyed, since the parts of material to be conveyed fall, for example, into the following chute at different locations in conveying thrusts.

The disadvantages which were mentioned at the outset are then avoided by virtue of the fact that the conveyor chute arrangement 2 has at least one wedge-shaped chute 6, 7.

Here, the stream of material to be conveyed or the parts of material to be conveyed can be guided by the wedge-shaped chute 6 or 7 onto the transport belt arrangement 3. The use of at least one wedge-shaped chute 6, 7 has the advantage that firstly the material can be accelerated in a speed cascade and at the same time the parts of material to be conveyed are centered. Parts of material to be conveyed which lie on one another are shaken apart by way of the wedge-shaped chute 6, with the result that said parts of material to be conveyed, in particular, frequently come to lie behind one another. The aim is to obtain a "pearl chain-like row" of the parts of material to be conveyed on the transport belt arrangement 3 by means of the separation device 1. Here, the parts of material to be conveyed are arranged, in particular, in a "monolayer", that is to say in one layer, and are spaced apart from one another, in particular (or are arranged so as to make contact merely at one point), with the result that the parts of material to be conveyed can be detected separately by a sensor for the sorting operation. A particularly high throughput can be achieved by means of the separation device 1.

In the refinement which is shown, two wedge-shaped chutes 6 and 7 are then arranged behind one another. The material to be conveyed or the parts of material to be conveyed passes/pass from the bunker chute 4 first of all into the first wedge-shaped chute 6 and from there into a wedge-shaped chute 7 which is inclined to a more pronounced extent. The wedge-shaped chutes 6, 7 are driven. The wedge-shaped chutes 6, 7 are configured, in particular, as unbalance chutes. The wedge-shaped chute 6 is arranged in a merely slightly inclined manner with respect to the horizontal, and the wedge-shaped chute 7 is arranged in a manner which is inclined to a more pronounced extent with respect to the horizontal, as a result of which the wedge-shaped chute 6 forms a first region and the wedge-shaped chute 7 forms a second region which is inclined to a more pronounced extent. The (second) wedge-shaped chute 7 is therefore arranged in a manner which is inclined to a more pronounced extent with respect to the horizontal than the first wedge-shaped chute 6.

It is conceivable in one alternative refinement to provide merely one wedge-shaped chute which, however, is not of straight configuration, but rather has regions which are inclined to a different extent, in order to achieve a corresponding speed cascade of the stream of material to be conveyed. A separation operation takes place by virtue of the fact that the parts of material to be conveyed are accelerated increasingly when passing through the conveyor chute arrangement 2 and, in particular, also the transport belt arrangement 3. Furthermore, the use of three or more wedge-shaped chutes is also possible or conceivable.

The stream of material to be conveyed is loosened and advanced in the first wedge-shaped chute 6 by way of the unbalance oscillation. The inclination of the first wedge-shaped chute 6 is adapted in such a way that the retention time in the first wedge-shaped chute 6 is still sufficient to achieve an, in particular, largely homogeneous distribution of the objects or the parts of material to be conveyed. Individual parts of material to be conveyed which are still arranged in two layers are separated by way of the fall onto the second wedge-shaped chute 7, since a lower part of material to be conveyed in the first wedge-shaped chute 6 first of all lands in freefall on the second wedge-shaped chute 7 and has then already been transported a little further before the second part of material to be conveyed which still lies on the top in the wedge-shaped chute 6 lands on the second wedge-shaped chute 7. A drop height between the second wedge-shaped chute 7 and the transport belt arrangement 3 is smaller than a drop height between the first wedge-shaped chute 6 and the second wedge-shaped chute 7. The drop height between the first wedge-shaped chute 6 and the second wedge-shaped chute 7 is, in particular, greater than the grain size of the material to be conveyed or the parts of material to be conveyed. This ensures that a monolayer is achieved at the end of the second wedge-shaped chute 7. Furthermore, the second wedge-shaped chute 7 serves to transfer the stream of material to be conveyed centrally onto the transport belt arrangement 3. The drop height to the transport belt arrangement 3 is merely small, in particular, with the result that the risk of lateral jumping and/or turning over of the parts of material to be conveyed is reduced.

The speed difference between the end speed of the material to be conveyed or the parts of material to be conveyed at the end of the second wedge-shaped chute 7 and the transport belt arrangement 3 is dimensioned in such a way, in particular, that the material to be conveyed or the parts of material to be conveyed is/are first of all calmed before the measurement and comes/come to lie quietly, without jumping laterally and without turning over.

The transport belt arrangement 3 has a transport belt 9 which is moved, in particular, in an endlessly circulating manner by means of a drive 10. The transport belt arrangement has a first region 8, a second region 11 and a third region 14. The transport belt 9 is flat in the first and third region 8, 14, since the transport belt 9 is deflected on the end side here. In the middle, second region 11, the transport belt has a trough or is of trough-shaped configuration.

In the first region 8, the transport belt 9 is still arranged or configured in a substantially flat manner, since the first region 8 is configured close to the starting position of the transport belt arrangement 3, the transport belt 9 running in the starting and end region about a substantially cylindrical, driven drum. Furthermore, the transport belt arrangement 3 has a third region 14 downstream of the troughed, second region 11, the transport belt 9 likewise being arranged or configured in a substantially flat manner here. Said third region 14 preferably serves as a discharge region.

It is conceivable that the drums are not of cylindrical configuration, but rather are of likewise troughed configuration, with the result that the transport belt is likewise troughed in the first and third region 8, 14.

The flat discharge region can also be configured as a separate, further transport belt or as a further belt section (not shown). Said further transport belt is preferably of dimpled configuration.

In the region 11, the material to be conveyed or the parts of material to be conveyed is/are transferred onto the transport belt 9. The troughing serves to center the parts of material to be conveyed. The trough assists during the central orientation of the material to be conveyed or the parts of material to be conveyed. The parts of material to be conveyed can thus not jump away toward the side, but rather rebound on the protruding belt flanks back into the center of the trough. After a defined distance, for example approximately 1 meter, the trough can be transferred gently again into a flat belt section, namely into the third region 14. The third region 14 can likewise be troughed, however.

Figure 4:
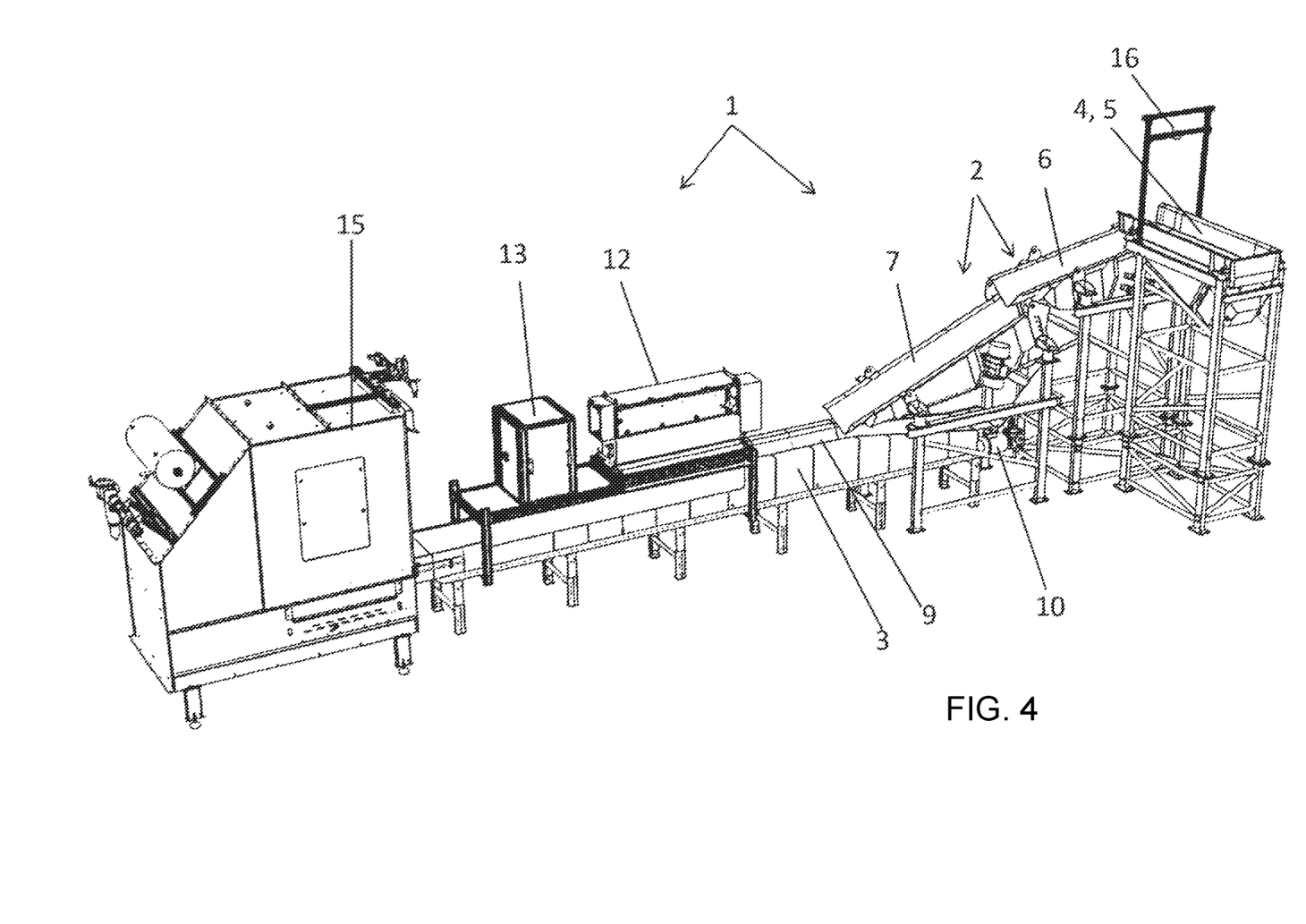
FIG. 4 shows a diagrammatic perspective illustration of a sorting apparatus in one preferred embodiment having the separation device from FIGS. 1 to 3.

The parts of material to be conveyed are graded by means of at least one sensor 12, 13. Here, the sensors 12, 13 can detect the parts of material to be conveyed from above in the region of the trough or else from above and/or from the side in the flat, third region 14. FIG. 4 shows two sensors 12, 13 in a greatly diagrammatic manner. Here, the sensor 12 can be assigned to the troughed region 11, and the sensor 13 can be assigned to the flat region 14. It is then essential in said second region 11 that the parts of material to be conveyed which move at a high speed lie in a manner which is centered in the middle, in order that they can be detected satisfactorily by the sensor 12 or 13. In one preferred refinement, the transport belt 9 is arranged or configured in a trough-shaped, in particular concave manner in said second region 11. This ensures that the parts of material to be conveyed continue to lie in a centered manner in the field of view of the sensors 12, 13. Said trough-like curvature of the transport belt 9 in the second region 11 can be achieved, in particular, by virtue of the fact that the transport belt 9 runs over a subconstruction which is curved in a trough-like manner, the transport belt 9 being sufficiently flexible to be adapted accordingly to said shape.

It is conceivable in one alternative refinement that the transport belt arrangement has two transport belts which lie in a wedge-shaped manner with respect to one another, and centering of the material to be conveyed in the viewing region of the sensors is ensured and lateral jumping is avoided. It is therefore conceivable that the transport belt arrangement has two transport belts which are arranged in a V-shaped manner with respect to one another. If, as in the case of the preferred embodiment, only one transport belt 9 is used, said transport belt 9, in particular if it is correspondingly flexible, can then be configured and/or arranged at least partially in a trough-shaped and/or V-shaped manner.

FIG. 4 then shows a sorting apparatus having a corresponding separation device 1, a discharge station 15 being shown in a greatly diagrammatic manner here at the end of the transport belt arrangement 3. In the refinement which is shown, the discharge can take place by way of a blow strip, the blow strip blowing out defined parts of material to be conveyed over a crown (not shown in greater detail), and it thus being possible for a plurality of grades to be formed. In one preferred refinement, however, the discharge does not take place by way of a blow strip which is arranged at the end of the transport belt arrangement 3 transversely with respect to the conveying direction, but rather laterally, since more discharge fractions can be formed in one sorting pass as a result. For example, three discharge units for lateral discharge can be provided, with the result that a total of four different discharge fractions can be formed in one sorting pass. The discharge units can operate, for example, by means of compressed air, can have a ram or flaps, or can operate by way of a water jet.

In particular, the costs for the sensors 12, 13 can be reduced by way of the described separation device 1, since the detectors 12, 13 have to cover only a small region for measurement. A substantially point measurement can be performed, in particular. It is not necessary to arrange a plurality of sensors next to one another, or to orient the sensor field of view by way of a deflection system in accordance with the material stream or the stream of material to be conveyed. Furthermore, it can be technically complex to arrange a plurality of sensors, for example a plurality of LIBS sensors, closely next to one another.

The first sensor 12 can measure, for example, whether the object or the respective part of material to be conveyed lies in the center of the transport belt 9. To this end, a 3D camera can be used. The first sensor 12 can measure the position of the material to be conveyed or the parts of material to be conveyed on the transport belt 9, for example, by means of laser triangulation. It is conceivable that a laser height measurement is performed by means of the first sensor 12, or that the first sensor 12 comprises a color camera for positional determination.

The sorting criteria are detected by means of the second sensor 13. In particular, an LIBS detector can be used as second sensors or detectors 13. Here, said LIBS detector can perform a point measurement at a fixed location in the transport belt arrangement 3, or it is conceivable that the laser beam can be moved slightly by means of a mirror.

As an alternative, the second sensor/detector 13 can be configured as an XRF detector, as a Raman spectrometer or as a high resolution optical camera, for example with from 4 to 20 cm viewing width, or as an optical spectrometer, for example as a near-infrared spectrometer. Furthermore, it is possible to use an inductive sensor and/or at least one radioscopic X-ray sensor. If a plurality of X-ray sensors are used, the material to be conveyed can preferably be analyzed from more than one radioscopic direction, since the parts of material to be conveyed lie behind one another.

It is conceivable that the second sensor 13 is arranged downstream of a transport belt arrangement 3, and the sensor 13 detects the material to be conveyed in the flight phase from a plurality of sides. The centering of the stream of material to be conveyed or the parts of material to be conveyed which has previously taken place is also essential here, in order for it to be possible to precisely predict the flight path of the material to be conveyed or the parts of material to be conveyed during the detection.

The disadvantages which were mentioned at the outset are therefore avoided, and corresponding advantages are achieved.

LIST OF DESIGNATIONS

1 Separation device
2 Conveyor chute arrangement
3 Transport belt arrangement
4 Bunker chute
5 Magnetically oscillating chute
6 Wedge-shaped chute
7 Wedge-shaped chute
8 First region
9 Transport belt
10 Drive
11 Second region
12 Sensor
13 Sensor
14 Third region
15 Discharge station
16 Filling level sensor

The invention claimed is:
1. A separation device, comprising:
a transport belt configuration;
a conveyor chute configuration for conveying a material to be conveyed to said transport belt configuration, said conveyor chute configuration having regions being inclined to a different extent, and it being possible for a speed cascade of a stream of the material to be conveyed to be achieved by way of said regions which are inclined to the different extent, said conveyor chute configuration having a first wedge-shaped chute and a second wedge-shaped chute, said second wedge-shaped chute being disposed downstream of said first wedge-shaped chute, said second wedge-shaped chute for conveying the material to said transport belt configuration, said second wedge-shaped chute being disposed or being capable of being disposed in a manner which is inclined to a greater extent than said first wedge-shaped chute; and
a drop height between said second wedge-shaped chute and said transport belt configuration being smaller than a drop height between said first wedge-shaped chute and said second wedge-shaped chute.

2. The separation device according to claim 1, wherein said conveyor chute configuration has a driven bunker chute, it being possible for the material to be conveyed to be transferred from said driven bunker chute to said first wedge-shaped chute.

3. The separation device according to claim 2, wherein said driven bunker chute is configured as a magnetically oscillating chute.

4. The separation device according to claim 2, further comprising a filling level sensor associated with said driven bunker chute, it being possible for the stream of the material to be conveyed to be detected within said driven bunker chute by means of said filling level sensor.

5. The separation device according to claim 4, wherein said driven bunker chute can be regulated and/or controlled in a manner which is dependent on sensor data of said filling level sensor.

6. The separation device according to claim 1, wherein said transport belt configuration has an endlessly circulating transport belt, said endlessly circulating transport belt being of troughed and/or V-shaped configuration in one region.

7. The separation device according to claim 6, wherein the material to be conveyed passes from said second wedge-shaped chute to said endlessly circulating transport belt into said region of said troughed and/or V-shaped configuration of said endlessly circulating transport belt.

8. The separation device according to claim 6, wherein said endlessly circulating transport belt is of dimpled or corrugated configuration.

9. The separation device according to claim 1, wherein said second wedge-shaped chute is a last wedge-shaped chute.

10. A separation device, comprising:
a transport belt configuration having two conveyor belts which are arranged in a V-shaped manner with respect to one another; and
a conveyor chute configuration for conveying a material to be conveyed to said transport belt configuration, said conveyor chute configuration having regions being inclined to a different extent, and it being possible for a speed cascade of a stream of the material to be conveyed to be achieved by way of said regions which are inclined to the different extent, said conveyor chute configuration having a first wedge-shaped chute and a second wedge-shaped chute, said second wedge-shaped chute being disposed downstream of said first wedge-shaped chute, said second wedge-shaped chute for conveying the material to said transport belt configuration, said second wedge-shaped chute being disposed or being capable of being disposed in a manner which is inclined to a greater extent than said first wedge-shaped chute.

11. A sorting apparatus, comprising:
a separation device including a transport belt configuration having an endlessly circulating transport belt, said endlessly circulating transport belt being flat in a first region and being a troughed and/or V-shaped configuration in second region downstream from the first region, and
a conveyor chute configuration for conveying a material to be conveyed to said transport belt configuration, said conveyor chute configuration having regions being inclined to a different extent, and it being possible for a speed cascade of a stream of the material to be conveyed to be achieved by way of said regions which are inclined to the different extent, said conveyor chute configuration having a first wedge-shaped chute and a second wedge-shaped chute, said second wedge-shaped chute being disposed downstream of said first wedge-shaped chute, said second wedge-shaped chute for conveying the material to said transport belt configuration, said second wedge-shaped chute being disposed or being capable of being disposed in a manner which is inclined to a greater extent than said first wedge-shaped chute; and
at least one of a first sensor for determining a material property or a second sensor for determining a position of the material to be conveyed or parts of the material to be conveyed on said transport belt configuration.

12. The sorting apparatus according to claim 11, wherein said first sensor is configured as a laser-induced breakdown spectroscopy (LIBS) sensor, as an X-ray fluorescence (XRF) sensor, as a Raman spectrometer, as an X-ray sensor, as an inductive sensor and/or as a near-infrared (NIR) spectrometer.

13. The sorting apparatus according to claim 11, further comprising at least one discharge station disposed downstream of said first sensor or said second sensor.

14. The sorting apparatus according to claim 13, wherein said discharge station has at least one of a blow strip, a plurality of discharge units, or flaps.

* * * * *